Dec. 9, 1952  A. A. OBERMAIER  2,621,297
APPARATUS FOR MEASURING VAPOR CONTENT OF GAS
Filed Feb. 23, 1946  4 Sheets-Sheet 1

Inventor:
Alfred A. Obermaier
By Brown, Jackson, Boettcher &
Dienner
Attys.

Dec. 9, 1952 A. A. OBERMAIER 2,621,297
APPARATUS FOR MEASURING VAPOR CONTENT OF GAS
Filed Feb. 23, 1946 4 Sheets-Sheet 2
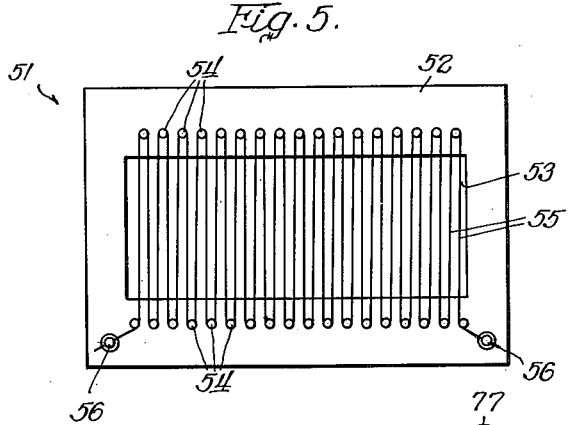
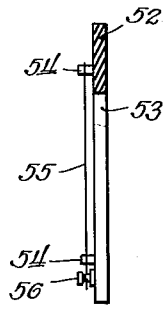
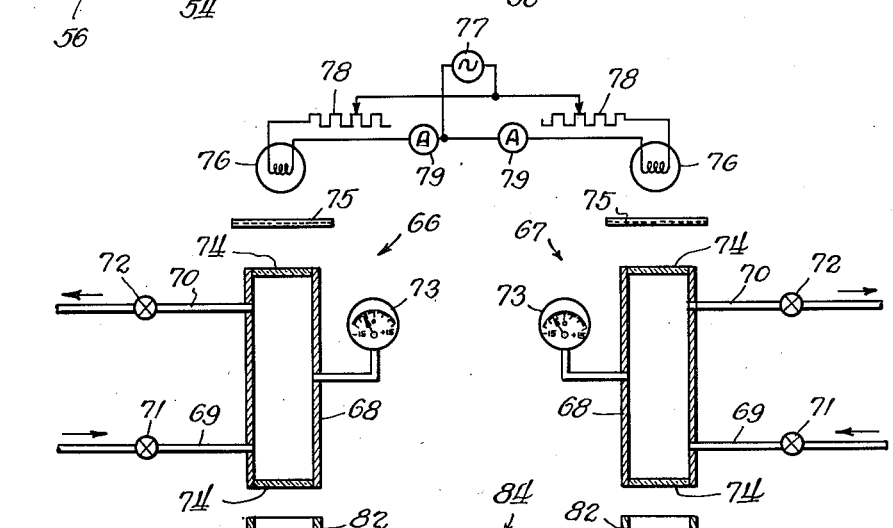
Inventor.
Alfred A. Obermaier
By Brown, Jackson, Boettcher & Dienner
Attys.

Dec. 9, 1952  A. A. OBERMAIER  2,621,297
APPARATUS FOR MEASURING VAPOR CONTENT OF GAS
Filed Feb. 23, 1946  4 Sheets-Sheet 3

Inventor:
Alfred A. Obermaier
By Brown, Jackson, Boettcher & Dienner
Attys.

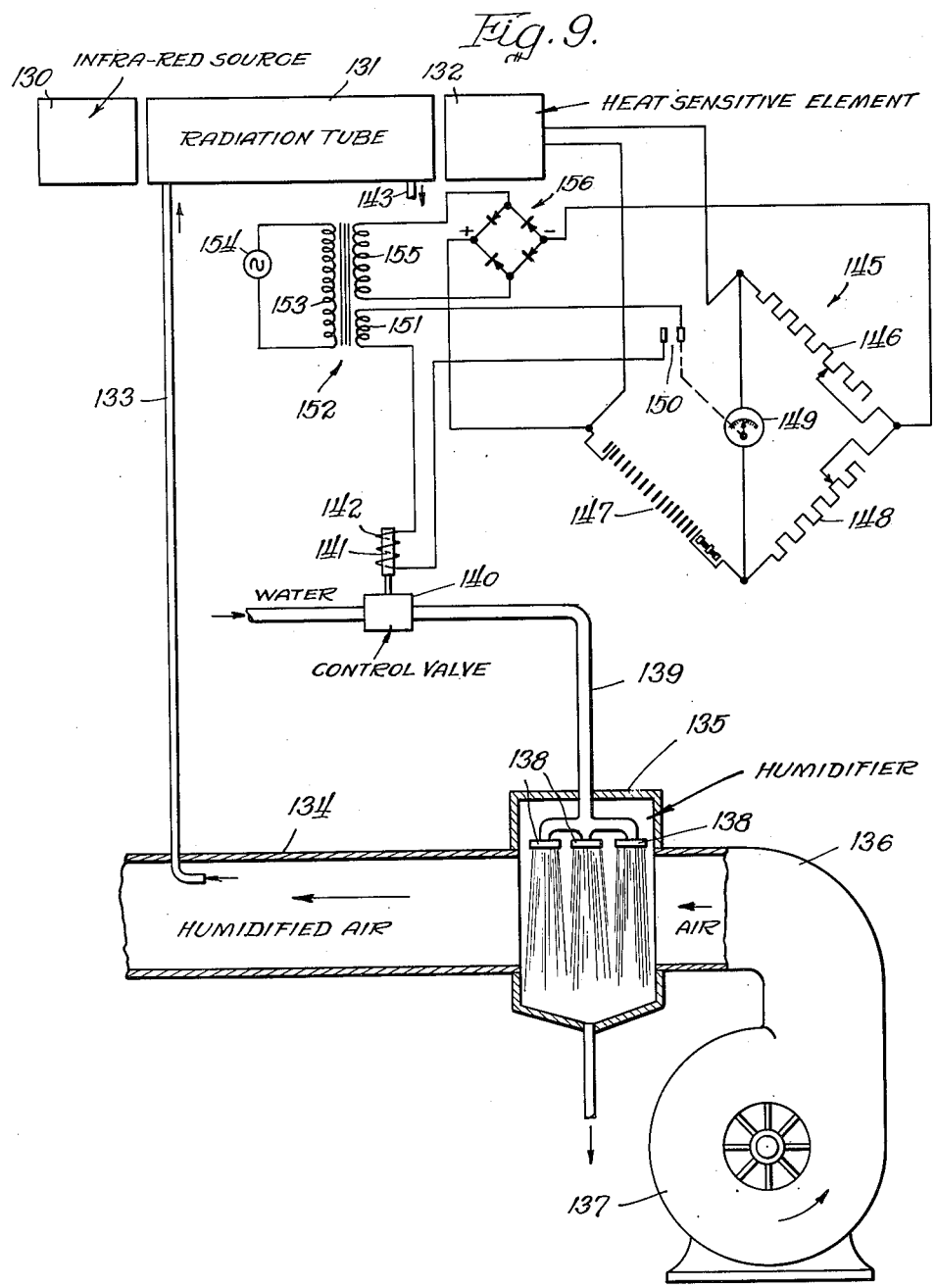

Patented Dec. 9, 1952

2,621,297

UNITED STATES PATENT OFFICE 2,621,297

APPARATUS FOR MEASURING VAPOR CONTENT OF GAS

Alfred A. Obermaier, Chicago, Ill., assignor to Illinois Testing Laboratories, Inc., Chicago, Ill., a corporation of Illinois Application February 23, 1946, Serial No. 649,567

4 Claims. (Cl. 250—43.5)

My invention relates, generally, to method of and means for measuring and controlling the humidity of gases and it has particular relation to the use of radiant or infra-red heat for these purposes.

It has long been known that the transmission of radiant heat through gases varies depending upon the composition of the gas. That is, the absorption of radiant heat by gaseous matter depends upon the character thereof.

The present invention relates particularly to the measurement of the diathermancy of air with a view to determining the water vapor content or the dew point thereof. It is desirable to have an accurate measurement of the dew point of the air for laboratory test purposes and other purposes so that proper account can be taken of this factor in interpreting the results. It is also desirable, particularly in connection with air conditioning systems, to provide means for automatically controlling the humidity of the air.

It is known that the percent of transmission of infra-red radiation through water varies with the wave length of the radiation. The percentage of transmission is at a minimum at a wave length of about 3 microns and also at a wave length of about 6 microns. Stated conversely, the infra-red absorption for water is a maximum at wave lengths of about 3 and 6 microns. In accordance with the present invention advantages taken of this characteristic of water in the application there to of a limited band of wave lengths of infra-red radiation for measuring the vapor content of a gas.

Accordingly, the object of my invention generally stated, is to provide a method of and means for employing infra-red heat for determining the vapor content of a gas, such as air, which shall be simple and efficient and which may be readily and economically used.

Another object is to employ radiant or infra-red heat in measuring the diathermancy of water vapor.

A further object is to measure the diathermancy of water vapor over wide ranges of temperature and pressure.

Still another object is to compare the diathermancy of a test gas with that of a standard gas in order to determine the diathermancy of the former.

A still further object is to employ a single source of infra-red heat for making the comparison.

Another object is to employ radiant heat having a narrow range of wave lengths in order to increase the accuracy of the measurements or the control.

A further object is to control the humidity of gas, such as air, in accordance with its diathermancy.

Other objects of my invention will, in part, be obvious and in part appear hereinafter.

For a more complete understanding of the nature and scope of my invention, reference may be had to the following detailed description, taken in connection with the accompanying drawings, in which:

Figure 5 is a view, in front elevation, of a resistance element and its mounting which may be used as the temperature sensitive element in Figure 1;

Figure 6 is a view, in end elevation, of the device shown in Figure 5, a part being broken away to show the character of the frame;

Figure 7 illustrates, diagrammatically, how two of the measuring devices shown in Figure 1 may be employed for comparing the diathermancy of a test gas with that of a standard gas;

Figure 9 illustrates, diagrammatically, how the present invention can be employed for controlling the humidity of air.

Figure 1:
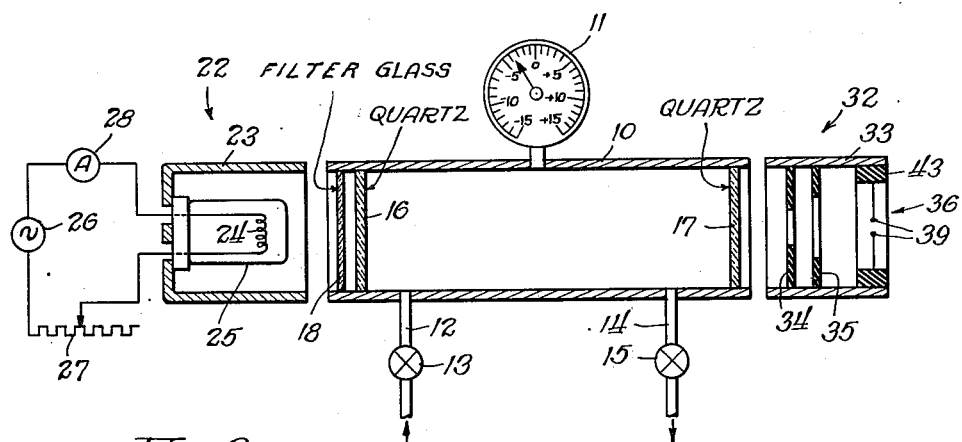
Figure 1 is a sectional view, partly diagrammatic, which illustrates one embodiment of my invention.

Referring now particularly to Figure 1 of the drawings, it will be observed that the reference character 10 designates a radiation tube, which may be made of brass, for receiving the gas whose diathermancy is to be measured. A suitable gauge 11 is provided and is connected to the tube 10. It is calibrated to indicate the pressure therein. An inlet conduit 12 is connected to the tube 10, as shown, and it has a control valve 13. An outlet tube or conduit 14 is also connected to the tube 10 and it likewise has a control valve 15.

The ends of the radiation tube 10 may be closed by windows 16 and 17 of fused quartz having a thickness of about 1/8". The quartz windows 16 and 17 serve to seal the ends of the tube 10 and also to transmit a substantial amount of infra-red radiation having a wave length below about 3.5 microns. There is also provided a filter glass 18, preferably having a thickness of 2 mm., which transmits infra-red radiation in the band from about 1 micron to about 3.5 microns. The filter glass has a relatively sharp cut off at about 1 micron when a dark red filter glass, identified in the open market as Corning No. 2550, is used.

If desired, the window 16 can be omitted and the window 17 can be formed of the filter glass which is used for the filter 18. However, this may reduce slightly the transmission efficiency of the radiation tube 10. Moreover, the window 16 alone may be omitted where the filter glass 18 is arranged to seal the corresponding end of the radiation tube 10. The windows 16 and 17 can also be formed of silicon glass obtainable in the open market as Corning No. 791. The principal objective to be obtained is the provision of means for transmitting through water vapor infra-red radiation having a wave length as nearly as possible to 3 microns so as to take advantage of the maximum absorption by water vapor of such radiation. Thus, provision is made for the transmission of infra-red radiation in the band from 1 micron to 3.5 microns.

It will be recalled that infra-red radiation absorption for water is at a maximum when this band of wave length is used. Consequently, maximum sensitivity of the measuring apparatus is provided when this particular band of wave length is employed.

A source of infra-red radiation is indicated, generally, at 22. This source includes a metallic shield or reflector 23, which may be formed of brass, and a heating element 24, preferably of platinum, enclosed in a quartz envelope 25. The filament 24 is sealed in the envelope 25 and forms a conventional arrangement to provide a source of infra-red radiation.

Preferably the infra-red radiation source 22 operates at a temperature of 1900° F. At this temperature of the source and using filter glass of the character hereinbefore described, a spectral band of high intensity approximately from 2 to 3.5 microns can be obtained with maximum emissivity at 3 microns. The change in total radiation over this wave band due to absorption of the 3 micron radiation by water vapor is adequate for measuring the dew point of a gas. For the source 22, a lamp having a tungsten filament and a quartz envelope can be used. Also, a suitably arranged silicon carbide rod heated electrically to the preferred temperature of 1900° F. can provide a satisfactory source of infra-red radiation for my purpose.

The filament 24 may be connected for energization, as shown, to a source 26 of alternating current, such as a 60 cycle 110 volt source. If desired, of course, a direct current source can be used. The voltage applied to the filament 24 may be regulated by variable resistor 27 and the current flow thereto may be measured by an ammeter 28.

The amount of radiant energy that is transmitted through the gas in the radiation tube 10 is a measure of the vapor content thereof. It remains then to provide some means for measuring this transmitted energy. One energy measuring means is shown, generally, at 32 in Figure 1 of the drawings. It may comprise a tubular housing 33 of brass having fiber shields 34 and 35 therein containing apertures of increasing diameter. A temperature sensitive element, shown generally at 36, is provided at the right hand end of the housing 33 for measuring the energy that is transmitted through the radiation tube 10 and is admitted into the housing 33 through the apertures in the shields 34 and 35. The temperature sensitive element 36 may comprise a thermopile a preferred construction of which is shown in Figure 3 of the drawings.

Figure 3:
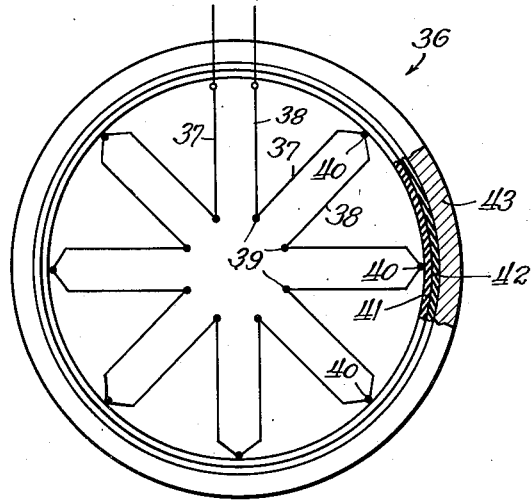
Figure 3 is a view, partly in elevation and partly in section, showing how the elements making up the thermopile used as the temperature sensitive element in Figure 1, may be arranged.

As shown in Figure 3 the temperature sensitive element 36 may comprise dissimilar elements 37 and 38 which are joined together to provide hot junctions 39 and cold junctions 40, as shown. The elements 37 and 38 may be formed of .003 inch "Chromel" and "Constantan" wires. It will be understood, however, that other metals may be employed for the thermopile elements 37 and 38.

It will be noted that the hot junctions 39 are arranged in a circle where they can be subjected to the heat energy transmitted through the radiation tube 10 and into the housing 33. The cold junctions 40 are held in place in varnished silk, indicated at 41 over a fiber ring 42 that is mounted within a metal ring 43 which forms a support frame for the temperature sensitive element 36.

Of course it is possible to measure the voltage which is generated across the thermopile with a suitably calibrated voltmeter. It will be understood that the meter may be calibrated in terms of water vapor content or dewpoint of the gas in the radiation tube 10. However, where it is desired to measure the water vapor content or dewpoint of gases over a wide range, it is not practical to employ a measuring instrument connected directly across the thermopile element.

Figure 2:
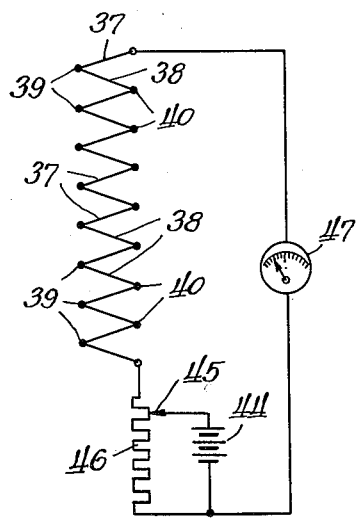
Figure 2 illustrates, diagrammatically, a preferred circuit arrangement for the temperature sensitive element employed in Figure 1 so as to accommodate wide ranges of temperatures and pressures.

In order to take care of this situation a differential thermopile circuit may be used as illustrated in Figure 2. It will be observed that a battery 44 is arranged to oppose the voltage generated by the thermopile elements 37 and 38. The battery voltage is applied variably by a slider 45 which cooperates with a resistor 46. A measuring instrument 47 is connected across the series combination and, it will be understood, it measures the differential voltage between the thermopile and the battery 44.

In operation the gas of known dewpoint is passed through the chamber or radiation tube 10 by opening the valves 13 and 14. This gas is allowed to flow through the radiation tube 10 for a sufficient length of time to clean it out and to insure that only this gas is present. The valves 13 and 15 are then closed. The resistor 27 is then adjusted so as to provide the desired energization of the filament 24. The indication on the scale of the measuring instrument 47 is noted. The pointer 45 is adjusted along the resistor 46 so as to bring the needle of the instrument 47 to the desired position along the scale. Preferably the dewpoint of the known gas is fairly close to that of the unknown gas so that the position of the pointer 45 along the resistor 46 can be chosen to give the maximum sensitivity to the instrument 47.

Now the source of test gas is connected to the radiation tube 10 by opening the valve 13. The valve 15 is opened to allow the test gas to fill the radiation tube 10 and to clear it of the gas previously contained therein. After a sufficient amount of the test gas has flowed through the radiation tube 10 so as to insure that it contains only the test gas, the valves 13 and 15 are closed. Of course, the pressure as indicated by the gauge 11 is adjusted so as to be the same for both the standard gas and the test gas so that the measurements will be made under identical pressure conditions. It is also assumed that the current as indicated by the meter 28 for heating the filament 24 will be the same for both test runs.

The deflection of the pointer of the measuring instrument 47 is then noted. If it is the same as for the standard gas then it will be apparent that the test gas has the same dewpoint as the standard gas. If the deflection of the pointer of the instrument 47 is less that obtained when measuring the standard gas then the dewpoint of the test gas is correspondingly higher than that of the standard gas. Likewise if the deflection is higher the dewpoint is lower. The difference in the deflections of the needle of the instrument 47 may be estimated as a percentage difference of dewpoint since the deflection is directly proportional to the specific humidty of the gas.

Instead of the thermopile type of temperature sensitive element, as shown at 36 and previously described, being used for measuring the energy that is transmitted through the radiation tube 10, a device may be used which depends on the change of electrical resistance with temperature. This is known as a bolometer. One form of this is illustrated in Figures 5 and 6 of the drawings.

The temperature measuring element of the bolometer is indicated, generally, at 51 in Figure 5 and may comprise a generally rectangular frame 52 having a window 53 therein. It will be understood that the frame 52 may be suitably mounted in the right hand end of the housing 33, Figure 1, in lieu of the temperature sensitive element 36 there shown of the thermopile type. The frame 52 may be provided with integrally formed projections 54 over which a wire 55 may be laced, as illustrated, with the ends being connected to terminals 56. The frame 52 may be formed of "Bakelite" and the wire 55 may be of .0001 inch diameter platinum wire.

Figure 4:
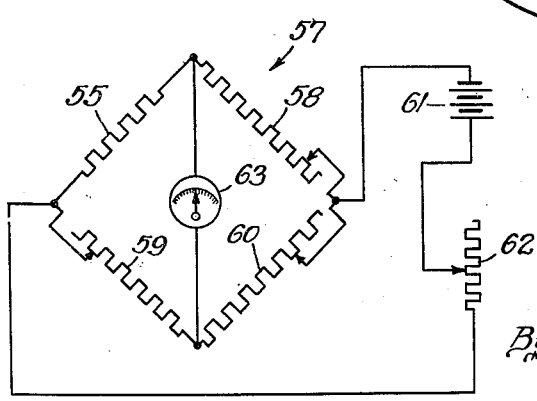
Figure 4 illustrates, diagrammatically, how a resistance element, used for the temperature sensitive element in Figure 1, may be connected in a Wheatstone bridge circuit to permit a wide range of measurement.

With a view to using the bolometer over a relatively wide range the wire 55, which forms a temperature sensitive resistor, may be connected in one arm of a Wheatstone bridge, shown generally at 57 in Figure 4 of the drawings. Resistors 58, 59 and 60, which are adjustable, make up the other arms of the bridge. It may be energized from a battery 61 through a variable resistor 62. A galvanometer 63 is connected across the bridge 57 for measuring the differential voltage in the customary manner. The resistors 58, 59 and 60 may be adjusted to provide for operating the bolometer at different ranges with maximum sensitivity as described hereinbefore in connection with the use of the biasing battery 44 for the thermopile type of temperature sensitive element 36.

In Figure 7 of the drawings there is shown a system for comparing the diathermancy of two gases, one of standard and the other a test gas, in order to determine the diathermancy of the latter. It will be noted that two measuring devices, shown generally at 66 and 67, are provided each of which corresponds generally to the device shown in Figure 1 of the drawings and described hereinbefore.

Each of the devices 66 and 67 comprises a housing or radiation tube 68 having an inlet conduit 69 and an outlet conduit 70. Valves 71 and 72 are provided in the conduits 69 and 70 for controlling the flow of gas therethrough. Gauges 73 are provided for indicating the pressure in the radiation tubes 68. The radiation tubes 68 are closed at their ends by windows 74 of quartz and a filter glass shield 75 having the characteristics of the filter glass 18 shown in Figure 1 is provided between the windows 74 and the upper ends of the radiation tubes 68 and sources 76 of infra-red radiation. The combination of the quartz windows 74 and filter glass shields 75 serves to restrict the wave length of the infra-red radiation which traverses the radiation tubes 68 to the desired band, as previously described, corresponding to maximum absorption thereof by water vapor. The sources 76 may be energized from a suitable current source 77, such as a 110 volt 60 cycle source through variable resistors 78. The sources 76 may be of the platinum or tungsten filament type or of the silicon carbide rod type as previously described to provide the desired temperature of 1900° F. Ammeters 79 are provided for individually measuring the current flow to each of the sources 76.

The energy transmitted through each of the radiation tubes 68 is measured by a bolometer element 82 located in a housing 83. The element 82 may be constructed as shown in Figures 5 and 6 of the drawings and described hereinbefore. They are connected in adjacent arms of a Wheatstone bridge, shown generally at 84 in which are located variable resistors 85. The other pair of arms of the Wheatstone bridge 84 comprise variable resistors 86. A galvanometer 87 is connected across the bridge 84 and it is arranged to be energized from a battery 88 through a variable resistor 89.

In operation a perfectly dry gas may be introduced in each of the devices 66 and 67 by opening the valves 71 and 72. After sufficient amounts of the dry gas have flowed through the radiation tubes 68 to insure that only this gas remains therein, the valves 71 and 72 are closed. The bridge 84 is then balanced so that the galvanometer 87 occupies the zero or center position by varying the energization of the infrared sources 76 through the adjustment of the variable resistors 78.

After the bridge 84 has been balanced in this manner the test gas may be introduced into one of the radiation tubes 68, for example the tube forming a part of the device 67. The valves 71 and 72 thereof are opened for a length of time sufficient to scavenge the radiation tube 68 and to insure that the test gas only is contained therein. The valves 71 and 72 are then closed. The pressures within the radiation tubes 68 as indicated by the gauges 73 should be the same, for example they may be of atmospheric pressure. After the valves 71 and 72 of the device 67 have been closed the reading of the galvanometer 87 is noted. Assuming that the test gas contains some water vapor, the galvanometer 87 will indicate a change which is proportional to the amount of moisture in the test gas. It will be understood that the scale of the galvanometer 87 may be calibrated in moisture units or provision may be made for bringing the bridge 84 again into balance by varying the resistors 86 in which the calibration may be effected in terms of resistance variation.

While the comparison method has been described using a perfectly dry gas as a standard, it will be understood that a gas having a predetermined water vapor content may be used as a standard. In such case an attempt would be made to select as a standard gas a gas having a water vapor content nearly approximating that of the test gas. This would permit a high degree of accuracy in measuring the water vapor content of the test gas by comparing it with the standard gas, as will be readily understood.

Figure 8:
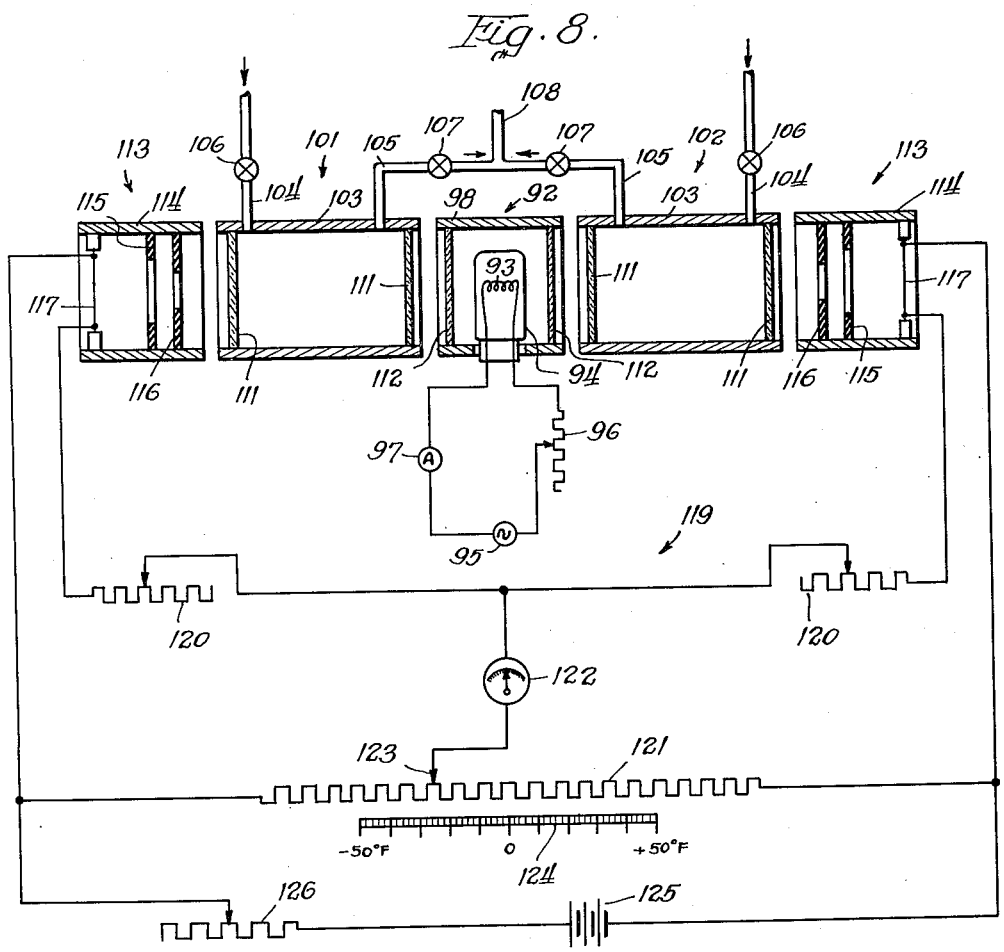
Figure 8 illustrates diagrammatically, how a single source of radiant energy can be employed for making the comparison between the gases in lieu of the separate sources shown in Figure 7.

In Figure 8 of the drawings a comparison system is shown in which a single source, indicated generally at 92, of infra-red radiation can be used. The source may include a filament 93, of platinum or tungsten within a quartz envelope 94. Also a silicon carbide rod can be used to provide the desired temperature of 1900° F. The filament 93 is energized from a source 95, such as a 110 volt 60 cycle source, through a variable resistor 96. The current flow can be measured by an ammeter 97. The filament 93 and its envelope 94 are located within the tubular housing 98 that is disposed between a pair of comparsion measuring devices indicated generally at 101 and 102. As described hereinbefore each of these devices may include a radiation tube 103 having an inlet conduit 104 and an outlet conduit 105. Valves 106 and 107 control the flow of gas through these conduits. As shown, the conduits 105 may be joined in a single outlet conduit 108. The ends of the radiation tubes 103 are closed by quartz windows 111. Filter glass shields 112 having the characteristics of the filter glass 18 of Figure 1 may be provided on opposite sides of the source of infra-red radiation within the housing 98 in order to limit the wave length of the infra-red radiation applied to the gases in the radiation tubes 103.

The energies transmitted through the radiation tubes 103 may be measured by the measuring devices indicated generally at 113. These are similar to the measuring device 32 shown in Figure 1 of the drawings. Each comprises a tubular housing 114 disposed in alignment with the radiation tubes 103. Shields 115 and 116 are provided for directing the infra-red radiation onto a bolometer element 117, preferably in the form of a resistance element as shown in Figures 5 and 6 of the drawings.

The resistance elements 117 are connected in adjacent arms of a Wheatstone bridge, shown generally at 119 through variable resistors 120. A single resistor 121 may comprise the other two arms of the Wheatstone bridge 119 and a galvanometer 122 may be connected thereto by a slider 123. A scale indicated at 124 cooperates with the slider 123 to provide the necessary calibration of the bridge 119. The bridge 119 may be energized from a battery 125 through a variable resistor 126.

The operation of the comparison measuring apparatus shown in Figure 8 is similar to that of the apparatus shown in Figure 7 and described hereinbefore. Accordingly, the description will not be repeated here. Of course, it will be understood that, since a single source of infra-red radiation is used in the system shown in Figure 8, it will be unnecessary to perform the balancing step of the sources described for Figure 7. All that is necessary will be to balance the bridge 119 or to observe the indication on the galvanometer 122 or with respect to the scale 124 as the case may be.

In Figure 9 of the drawings there is shown a system in which the vapor content measuring means of a gas can be employed for controlling the humidity thereof. This system can be used advantageously for controlling the humidity of air supplied in air conditioning systems or for controlling the humidity of air for test purposes or the like.

As shown in the drawings there is provided an infra-red source 130 at one end of a radiation tube 131. The energy transmitted through the radiation tube 131 may be measured by a heat sensitive element 132. It will be recognized that this combination of elements is essentially the same as shown in Figure 1 of the drawings and described hereinbefore. However, it will be understood that a bolometer element is used instead of the thermopile for measuring the energy transmitted through the radiation tube 131.

The gas flowing through the radiation tube 131 may be conducted thereto by a conduit 133 which is connected to an air duct 134 through which humidified air flows. In the duct 134 is a humidifier 135 which is supplied with air by a conduit 136 by means of a blower 137. Nozzles 138 are provided in the humidifier 135 which are supplied with water through a conduit 139 having a control valve 140 therein. The control valve 140 may be provided with an armature 141 and an operating winding 142 in cooperative relation thereto.

It will be understood that a portion of the humidified air flowing through the duct 134 is conveyed through the conduit 133 to the radiation tube 131 where the vapor content thereof is measured. It is exhausted therefrom through an outlet conduit 143.

The heat sensitive element 132 is connected into one arm of a Wheatstone bridge, shown generally at 145. The adjacent arm is formed by a variable resistor 146. The opposite arms may be formed, respectively, by a carbon pile regulator 147 and a variable resistor 148. A galvanometer type relay 149 is connected across the bridge 145 for controlling the opening and closing of contacts 150 connected in series circuit relation with the winding 142 and a secondary winding 151 of a transformer, shown generally at 152 which provides a source of energization for the winding 142. The transformer 152 has a primary winding 153 that may be connected for energization across a source 152 of alternating current, such as 110 volt 60 cycle source.

The transformer 152 is provided with another secondary winding 155 which serves to energize a bridge type rectifier, shown generally at 156, which may be used for energizing the bridge 145.

It will be understood that the bridge 145 may be adjusted so as to control the opening and closing of the contacts 150 in such manner as to maintain a predetermined humidity in the air passing to the duct 134 by controlling the degree of opening and closing of the control valve 140.

Figure 10:
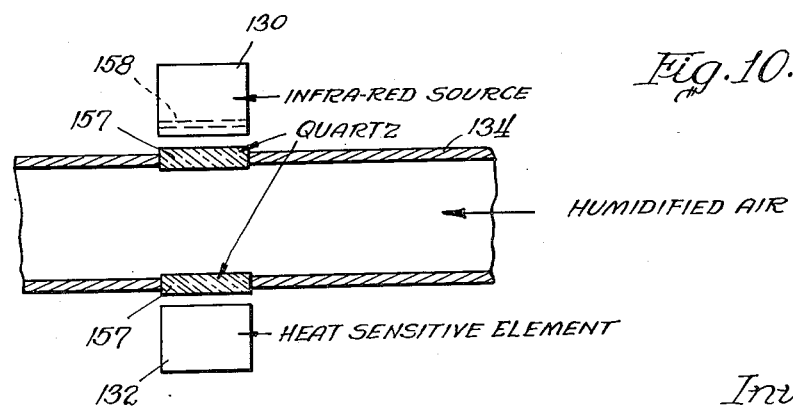
Figure 10 shows an alternate form for applying the infra-red radiation to the humidified air for measuring the humidity thereof for this purpose alone or for controlling the humidity by means such as those illustrated in Figure 9.

In Figure 10 of the drawings there is illustrated a system in which it is unnecessary to employ the radiation tube 131, as shown in Figure 9. The infra-red source 130 may be located on one side of the duct 134 and heat sensitive element 132 may be located on the opposite side. The duct 134 may be provided with quartz windows 157 and a shield 158 of filter glass or the like may be provided in conjunction with the infra-red source 130 for the purpose of limiting the wave length of the radiation transmitted through the duct 134, as will be readily understood.

Since certain further changes can be made in the foregoing constructions and different embodiments of the invention can be made without departing from the spirit and scope thereof, it is intended that all matter shown in the accompanying drawings or described hereinbefore shall be interpreted as illustrative and not in a limiting sense.

I claim as my invention:

1. Humidity measuring means comprising, in combination, means providing a source of infra-red radiation, a first chamber for containing gas the humidity of which is known, a second chamber for containing gas the humidity of which is to be measured, opposite walls of each of said chambers being formed of fused quartz and aligned with said source, the energies transmitted from said source through the quartz walls of said chambers and the gases therebetween being functions of the humidities of said gases, and means for comparing said transmitted energies.

2. Humidity measuring means comprising, in combination, means providing a source of infra-red radiation, a first chamber for containing gas the humidity of which is known, a second chamber for containing gas the humidity of which is to be measured, opposite walls of each of said chambers being formed of fused quartz and aligned with said source, the energies transmitted from said source through the quartz walls of said chambers and the gases therebetween being functions of the humidities of said gases, a resistor individual to each of said chambers and subjected to the energy transmitted therethrough whereby the resistance thereof is a function of the transmitted energy, and means for connecting said resistors in a Wheatstone bridge circuit for comparing the resistances thereof to indicate the relative humidity of the gas in said second chamber.

3. The invention, as set forth in claim 1, wherein a single source of infra-red radiation is common to both chambers.

4. The invention, as set forth in claim 1, wherein the chambers are disposed in end to end relation, and a single source of infra-red radiation is located therebetween and is common thereto.

ALFRED A. OBERMAIER.

REFERENCES CITED

The following references are of record in the file of this patent:

UNITED STATES PATENTS

| Number | Name | Date |
|---|---|---|
| Re. 16,270 | Varley | Feb. 16, 1926 |
| 1,691,138 | Schmick | Nov. 13, 1928 |
| 1,789,268 | Anderson | Jan. 13, 1931 |
| 1,855,774 | Schneider | Apr. 26, 1932 |
| 1,885,791 | Anderson | Nov. 1, 1932 |
| 1,902,173 | Larson | Mar. 21, 1933 |
| 1,933,803 | Hickman | Nov. 7, 1933 |
| 1,984,112 | Buchholz | Dec. 11, 1934 |
| 1,988,858 | Quereau | Jan. 22, 1935 |
| 2,128,176 | Bast et al. | Aug. 23, 1938 |
| 2,269,674 | Liddel et al. | Jan. 13, 1942 |
| 2,286,985 | Hanson | June 16, 1942 |
| 2,332,975 | Palmer | Oct. 26, 1943 |
| 2,404,064 | Heigl et al. | July 16, 1946 |